United States Patent
Toudou et al.

(10) Patent No.: US 9,285,277 B2
(45) Date of Patent: Mar. 15, 2016

(54) TEMPERATURE SENSOR

(75) Inventors: Yuusuke Toudou, Kariya (JP); Takashi Kojima, Kasugai (JP); Tomohiro Adachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 13/221,022

(22) Filed: Aug. 30, 2011

(65) Prior Publication Data
US 2012/0051397 A1    Mar. 1, 2012

(30) Foreign Application Priority Data

Aug. 30, 2010  (JP) .................................. 2010-192089
May 27, 2011  (JP) .................................. 2011-119092

(51) Int. Cl.
G01K 7/22 (2006.01)
G01K 1/14 (2006.01)
G01K 1/16 (2006.01)
G01K 1/12 (2006.01)
H01R 13/11 (2006.01)
H01R 13/428 (2006.01)
G01K 7/16 (2006.01)

(52) U.S. Cl.
CPC ............... *G01K 1/12* (2013.01); *H01R 13/111* (2013.01); *H01R 13/428* (2013.01); *G01K 2007/163* (2013.01); *G01K 2205/04* (2013.01)

(58) Field of Classification Search
CPC ............. G01K 3/00; G01K 1/14; G01K 1/16; G01K 7/00; G01K 7/22
USPC ......... 374/163, 183, 185, 100, 141, 208, 144, 374/179
See application file for complete search history.

(56) References Cited

U.S. PATENT DOCUMENTS

| 3,109,689 | A | * | 11/1963 | Cooney .......................... 439/329 |
| 4,053,196 | A | * | 10/1977 | Dunaway ..................... 310/68 R |
| 4,243,968 | A | * | 1/1981 | Scott ............................... 338/28 |
| 4,603,026 | A | * | 7/1986 | Martin ..................... 264/272.18 |
| 5,741,072 | A | * | 4/1998 | Yamaguchi et al. .......... 374/179 |
| 5,823,256 | A | * | 10/1998 | Moore .......................... 166/65.1 |
| 5,949,023 | A | * | 9/1999 | Weyl ........................... 174/77 R |
| 6,286,995 | B1 | * | 9/2001 | Takahashi et al. ............ 374/148 |
| 6,698,922 | B2 | * | 3/2004 | Adachi et al. ................. 374/208 |

(Continued)

FOREIGN PATENT DOCUMENTS

DE    4019392 A1 * 12/1991
EP    833550 A2 * 4/1998

(Continued)

*Primary Examiner* — Gail Kaplan Verbitsky
(74) *Attorney, Agent, or Firm* — Nixon & Vanderhye P.C.

(57) ABSTRACT

A temperature sensor has a temperature sensitive element for detecting a temperature, a sheath pin having core wires electrically connected to the temperature sensitive element, lead wires to output a detection signal of the temperature sensitive element to an outside device, connectors through which the core wires and the lead wires are connected, and a protection tube accommodating the core wires, the lead wires and the connectors. The protection tube has a supporting member made of an elastic member having inserting and supporting holes through which the connectors are inserted and supported. Each connector has a circular arc part and claw parts. The circular arc part is made along a profile of a front end part of each lead wire. The claw parts are formed at both the end parts of the circular arc part. Each claw part pushes an inner wall surface of the corresponding inserting and supporting hole.

9 Claims, 6 Drawing Sheets

(56) References Cited

U.S. PATENT DOCUMENTS

| | | | |
|---|---|---|---|
| 6,899,457 B2 * | 5/2005 | Kurano | 374/185 |
| 6,997,604 B2 * | 2/2006 | Hanzawa et al. | 374/163 |
| 6,997,607 B2 * | 2/2006 | Iwaya et al. | 374/208 |
| 7,553,078 B2 * | 6/2009 | Hanzawa et al. | 374/185 |
| 2002/0039378 A1 * | 4/2002 | Shibayama | 374/148 |
| 2002/0061049 A1 | 5/2002 | Adachi et al. | |
| 2002/0135455 A1 * | 9/2002 | Murata et al. | 338/28 |

FOREIGN PATENT DOCUMENTS

| | | | |
|---|---|---|---|
| GB | 2257794 A | * | 1/1993 |
| JP | 01233333 A | * | 9/1989 |
| JP | 2002-221451 | | 8/2002 |

* cited by examiner

TEMPERATURE SENSOR

CROSS-REFERENCE TO RELATED APPLICATION

This application is related to and claims priority from Japanese Patent Applications No. 2010-192089 filed on Aug. 30, 2010 and No. 2011-119092 filed on May 27, 2011, the contents of which are hereby incorporated by reference.

BACKGROUND OF THE INVENTION

1. Field of the Invention

The present invention relates to temperature sensors capable of detecting a temperature of a detection target, for example, an exhaust gas flowing in an exhaust gas pipe placed in an exhaust gas purifying system of an internal combustion engine such as a diesel engine.

2. Description of the Related Art

A temperature sensor detects a temperature of an exhaust gas emitted from an internal combustion engine mounted to a motor vehicle. Such a temperature sensor is comprised of a sensor part and a wire harness. Through the wire harness, the temperature sensor outputs a detection signal to a control device mounted to the motor vehicle.

For example, a temperature sensor disclosed in a Japanese patent laid open publication No. 2002-221451 is comprised of a sensor part, core wires of a sheath pin, a connector, and a protection tube. The sensor part is capable of detecting a temperature of a detection target. The core wires of the sheath pin are connected to the sensor part. Through the connector the core wires of the sheath pin and lead wires are connected. The protection tube accommodates the core wires of the sheath pin. The connector and the connection part between the core wires of the sheath pin and the lead wires are fixed by ceramic material. The inside of the protection tube is filled with the ceramic material as a mold part. The lead wires are inserted into holes which are formed in the protection tube and supported by a corresponding bush therein. In addition, a cylindrical metal spacer is placed in an axial direction of the sheath pin between the bush and a stopper made of ceramic material.

However, the conventional temperature sensor having the above structure requires the mold part made of ceramic material, the bush, the spacer, etc. in order for the part, with which the core wires of the sheath pin and the corresponding lead wires are electrically connected together, such as ease of assembly, electrical insulation, to have necessary functions such as an electrical conductivity, a physical strength, a heat resistance of sealing, etc. Specifically, such a stopper is used in the temperature sensor in order to keep various functions such as ease of assembly, electrical insulation and conductivity between the core wires of the sheath pin and the lead wires. Further, the spacer is placed between the stoppers and the bushes in order to stop the stoppers to move in an axial direction and to keep the tension function thereof. Still further, the stoppers are caulked in order to keep the heat resistance function of sealing.

Accordingly, the above conventional temperature sensor has a complicated structure in order to keep the necessary functions previously described. The structure of the conventional temperature sensor prevents the manufacturing process of producing the temperature sensor form being complicated and the manufacturing cost thereof from being decreased.

SUMMARY OF THE INVENTION

It is an object of the present invention to provide a temperature sensor with a simple structure having various functions such as ease of assembly, electrical insulation and conductivity, high stress resistance, and high heat resistance necessary for a part to electrically connect core wires of a sheath pin with corresponding lead wires together.

To achieve the above purposes, the present exemplary embodiment provides a temperature sensor having a temperature sensitive element 3, a sheath pin composed of core wires, lead wires, connectors and a protection tube. The temperature sensitive element is configured to detect a temperature. The core wires of the sheath pin are electrically connected to the temperature sensitive element. The lead wires correspond to the core wires of the sheath pin, respectively. Through the lead wires a detection signal of the temperature sensitive element is output to an outside device. Through the connectors, the core wires of the sheath pin and the lead wires are electrically connected together. The protection tube accommodates the core wires of the sheath pin, the lead wires and the connectors. The protection tube is equipped with a supporting member. The supporting member is made of an elastic member having inserting and supporting holes through which the connectors are inserted and supported. In the temperature sensor, each of the connectors has a circular arc part and claw parts. The circular arc part is made along a profile of an outer circumference of a front end part of each lead wire. The claw parts are formed at both the end parts of the circular arc part. Each of the claw parts pushes an inner wall surface of the corresponding inserting and supporting hole.

In the temperature sensor according to an exemplary embodiment of the present invention, the connectors are inserted into the inserting and supporting holes of the supporting member made of an elastic member. The front end part of each conductive lead wire is supported by the communication part of the corresponding connector. The paired claw parts of the connector are pushed to the inner wall surface of the inserting and supporting hole. This structure makes it possible to support the paired claw parts of the connector by the inner wall surface of the inserting and supporting hole. That is, the above simple structure of the temperature sensor makes it possible to support the connectors in the protection tube through the supporting members. This makes it possible to decrease the number of manufacturing steps and also decrease the manufacturing cost of the temperature sensor.

Further, the temperature sensor has the improved structure of the connector and the supporting member which can satisfy all of important functions necessary for the part to connect the core wires of the sheath pin with the lead wires. For example, there are various important functions such as ease of assembly, electrical insulation, electrical conductivity, physical strength, a heat resistance of sealing.

Specifically, the structure of the temperature sensor according to the exemplary embodiment can increase the function of ease of assembly because of not being necessary to use ceramic material.

The structure of the temperature sensor according to the exemplary embodiment can maintain for the connector to support the core wires of the sheath pin and the lead wires by the shape of the claw parts formed at the end parts of the circular arc shape of each connector and the shape of each inserting and supporting hole in the supporting member made of elastic material. Further, the shape of each inserting and supporting hole can increase the supporting capability of the connectors.

In addition, the function of electrical insulation and conductivity can be maintained because the inserting and supporting hole is made of elastic material. This structure increases the electrical insulation between the connectors and between the connectors and the protection tube.

Still further, the electrical insulation of the components of the temperature sensor can be maintained because the supporting member absorbs the force to press the connectors even if the protection tube is deformed in order to caulk the lead wires and the supporting member. The material of the elastic member which forms the supporting member can increase the electrical insulation capability.

This structure of the temperature sensor can decrease the stress supplied to the core wires of the sheath pin. This makes it possible to suppress deformation of the core wires of the sheath pin and prevent electrical connection between the connectors.

Because the supporting member has the inserting and supporting holes and is made of an elastic member, and each connector has the claw parts which extent from both the end parts of the circular arc part in the circumference direction thereof, it is possible for the temperature sensor to have the function of strain resistance. This structure makes it possible for the supporting member to absorb the strain stress toward an axial direction of the lead wires and to decrease the stress supplied to the connectors.

Still further, because the supporting member in the temperature sensor is made of elastic material, it is possible to have the function of heat resistance of sealing.

As described above, the temperature sensor according to the exemplary embodiment of the present invention can have all of the functions such as ease of assembly, electrical insulation and conductivity, physical strength, heat resistance of sealing, etc. which are necessary to connect the core wires of the sheath pin with the lead wires, respectively.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
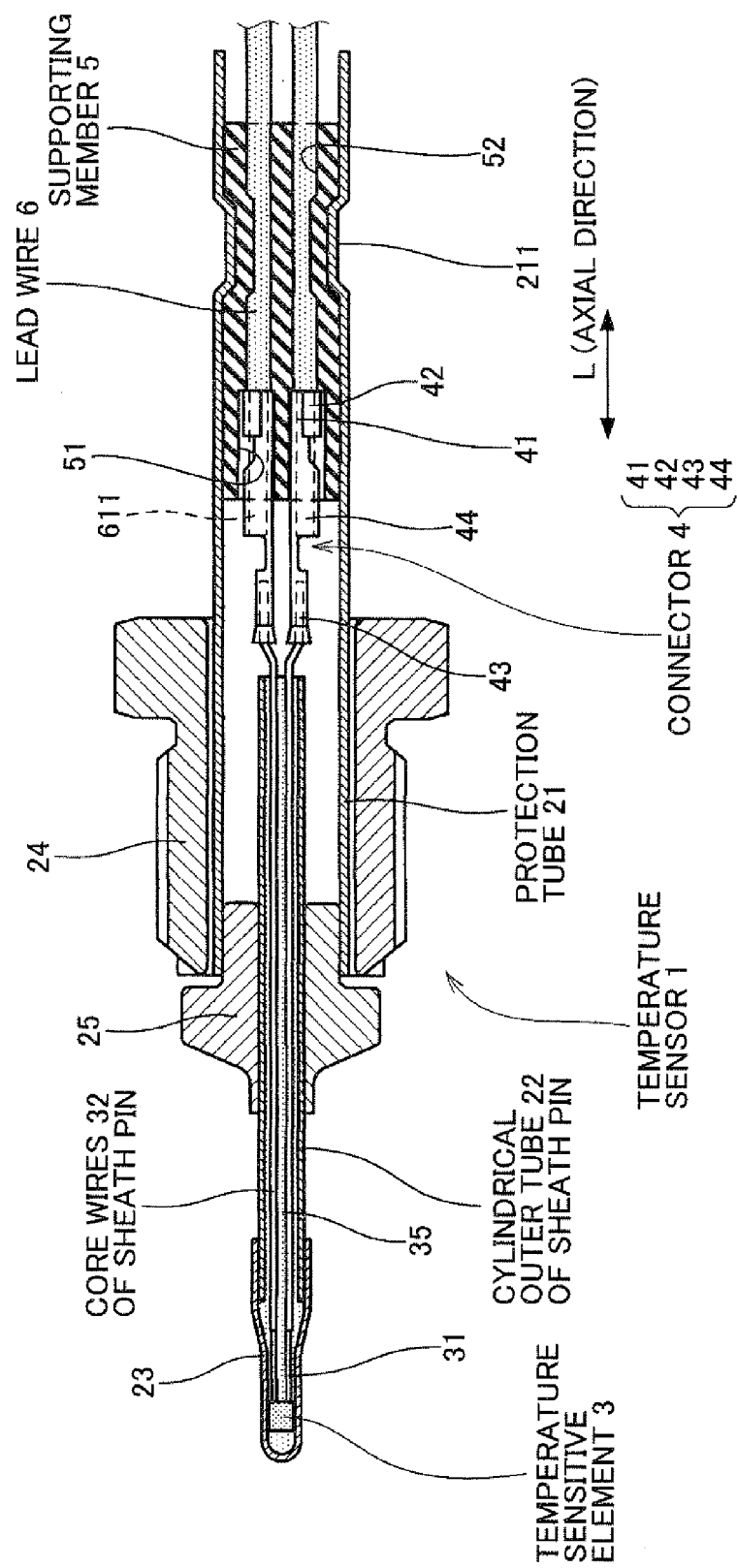
FIG. 1 is a view showing a cross section of a temperature sensor according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of the temperature sensor 1 according to an exemplary embodiment of the present invention with reference to FIG. 1 to FIG. 10.

FIG. 1 is a view showing a cross section of the temperature sensor 1 according to the exemplary embodiment of the present invention.

As shown in FIG. 1, the temperature sensor 1 is comprised of a temperature sensitive element 3, core wires 32 of a sheath pin connected to the temperature sensitive element 3, conductive lead wires 6, connectors 4 and a protection tube 21. Each of the core wires 32 of the sheath pin is electrically connected to the corresponding conductive lead wire 6 through the connectors 4. The protection tube 21 accommodates the lead wires 6 and the connectors 4.

A supporting member 5 is supported in the protection tube 21. The supporting member 5 has inserting and supporting holes 51 through which the connectors 4 are inserted in the protection tube 21. The supporting member 5 supports the connectors 4 in the protection tube 21.

Figure 2:
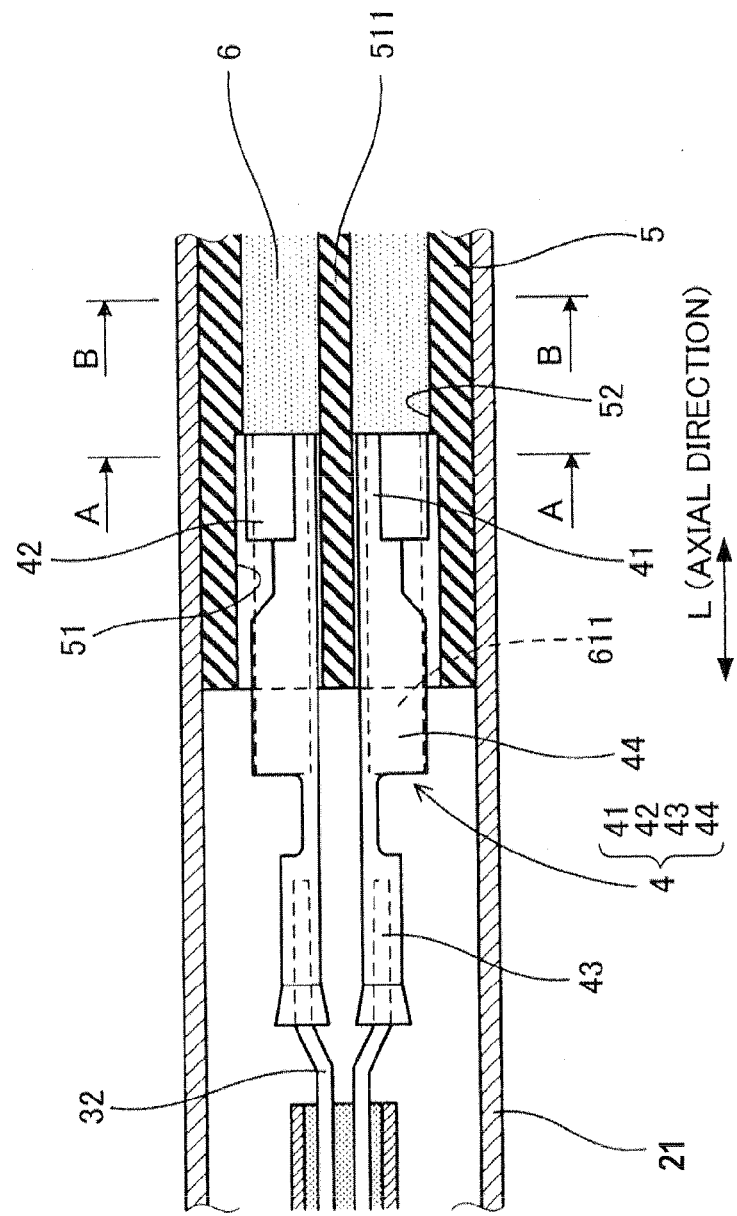
FIG. 2 is a view showing a cross section of a peripheral part of a connector and a supporting member in the temperature sensor shown in FIG. 1.
Figure 3:
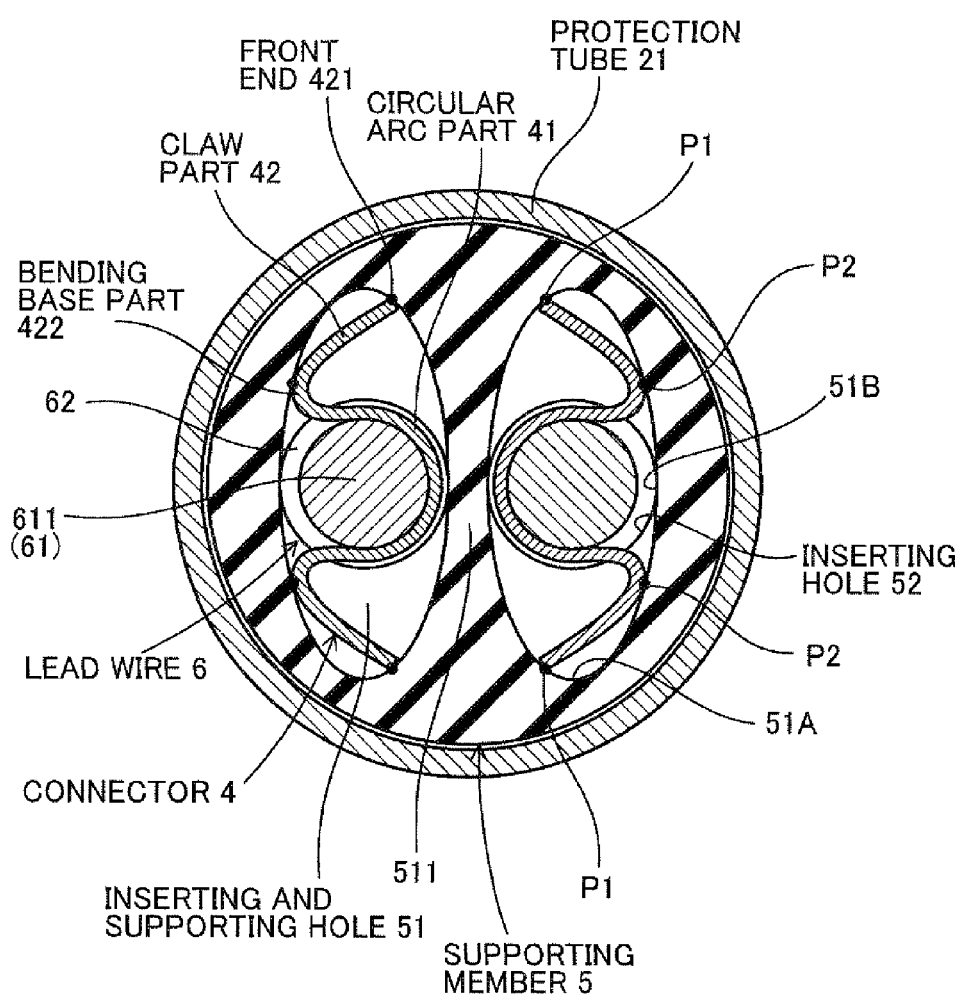
FIG. 3 is a view showing a cross section of the peripheral part of the connector and the supporting member along the A-A line shown in FIG. 2.

FIG. 2 is a view showing a cross section of a peripheral part of each of the connectors 4 and the supporting member 5 in the temperature sensor 1 shown in FIG. 1. FIG. 3 is a view showing a cross section of the peripheral part of the connector 4 and the supporting member 5 along the A-A line shown in FIG. 2.

As shown in FIG. 2 and FIG. 3, each of the connectors 4 is composed of a circular arc part 41 and claw parts 42. Each circular arc part 41 has a shape along the profile of the front end part of the conductive lead wire 6. The claw parts 42 are formed at both ends of the circular arc part 41 of each of the connectors 4. Each of the claw parts 42 supplies a pressure toward the inner wall surface of the corresponding inserting and supporting hole 51. The front end 611 of the conductive lead wire 6 is supported by a communication part 44 which is extended from the circular arc part 41.

In particular, the peripheral part of each of the connectors 4 and the supporting member 5 is shown in FIG. 2. A cross section of the peripheral part of each of the connectors 4 and the supporting member 5 is shown in FIG. 3.

A description will now be given of the temperature sensor 1 according to the exemplary embodiment with reference to FIG. 1 to FIG. 7.

As shown in FIG. 1, a pair of the core wires 32 of the sheath pin is inserted into and fixed to a cylindrical outer tube 22 of the sheath pin. The rear end part of the cylindrical outer tube 22 of the sheath pin is inserted into and fixed to the protection tube 21. The front end part of the cylindrical outer tube 22 of the sheath pin is covered with a front cap 23. The front cap 23 is fitted to the temperature sensitive element 3. In the exemplary embodiment, the temperature sensitive element 3 is composed of a thermistor. A pair of electrodes 31 extended from the temperature sensitive element 3 is electrically connected to one end of each of the core wires 32 of a pair of the sheath pin.

In the structure of the temperature sensor according to the exemplary embodiment, the core wires 32 of the sheath pin, the conductive lead wires 6, the connectors 4 and the paired electrodes 31 of the temperature sensitive element 3 are in one-to-one correspondence.

The temperature sensitive element 3 is placed in the front cap 23 through an insulation material 35 made of magnesium oxide (MgO). The paired core wires 32 of the sheath pin are placed in the cylindrical outer tube 22 of the sheath pin through an insulation material 35 made of magnesium oxide (MgO).

As shown in FIG. 2 and FIG. 3, the supporting member 5 has a pair of the inserting and supporting holes 51 and a pair of the inserting holes 52. The paired inserting and supporting holes 51 are formed in parallel to an axial direction L of the temperature sensor 1. The conductive lead wires 6 are inserted into the supporting member 5 through the paired inserting holes 52.

As shown in FIG. 3, each of the paired inserting and supporting holes 51 has a cross section of an ellipse shape. Further, as shown in FIG. 5, a cross section of each of the inserting holes 52 has a circular shape concentric with the corresponding inserting and supporting hole 51.

Figure 5:
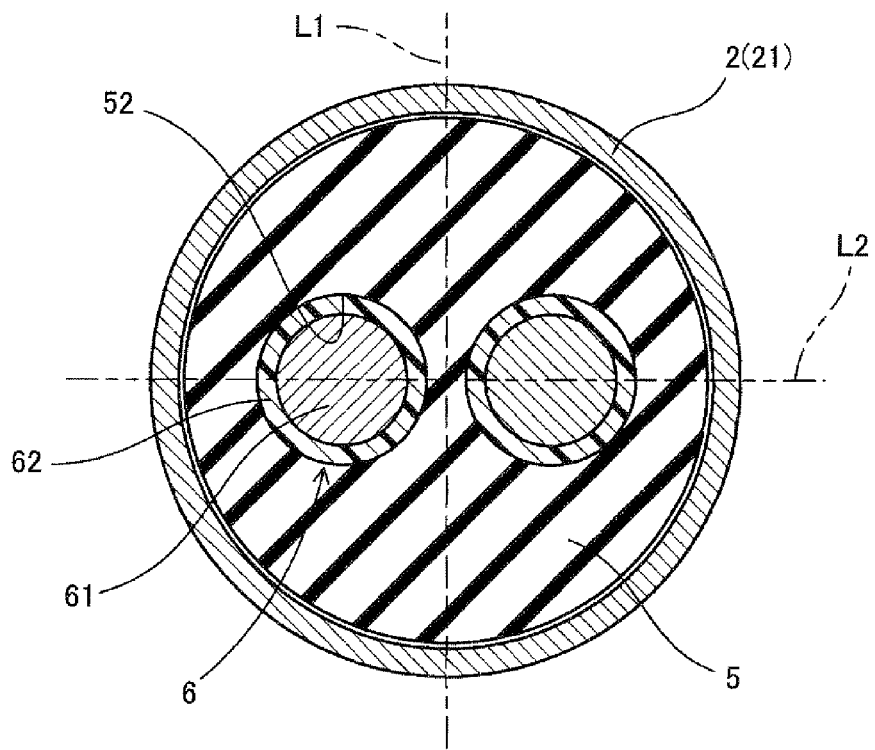
FIG. 5 is a view showing a cross section of the peripheral part of the connector and the supporting member along the B-B line shown in FIG. 2.

FIG. 5 is a view showing a cross section of the peripheral part of the connectors 4 and the supporting member 5 along the B-B line shown in FIG. 2. As shown in FIG. 5, each inserting hole 52 has a cross section of a circular shape, and is communicated with the corresponding inserting and supporting hole 51.

Figure 4:
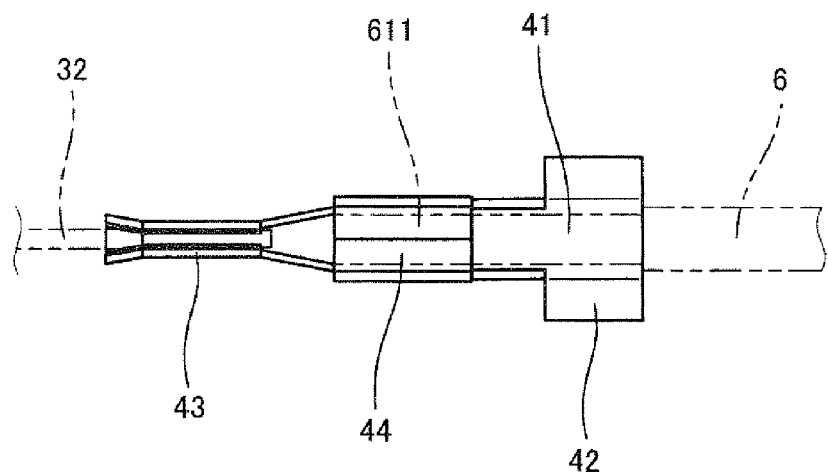
FIG. 4 is a view showing a cross section of each of the connectors along an axial direction (or a longitudinal direction) L in the temperature sensor shown in FIG. 1.

FIG. 4 is a view showing a cross section of each of the connectors 4 along an axial direction (or a longitudinal direction) L in the temperature sensor 1 shown in FIG. 1.

As shown in FIG. 2 and FIG. 4, the connectors 4 correspond to the paired core wires 32 of the sheath pin. The connector 4 is comprised of a pin connection part 43, a communication part 44, a circular arc part 41 and a pair of claw parts 42. The pin connection part 43 is electrically connected to the other end part of the corresponding core wire 32 of the sheath pin. The communication part 44 is electrically connected to a front end part of the corresponding conductive lead wire 6.

As shown in FIG. 4, the pin connection part 43, the communication part 44, the circular arc part 41 and the paired claw parts 42 are connected in series along an axial direction L of the temperature sensor 1.

The circular arc part 41 and the paired claw parts 42 are formed at one end of the connector 4 observed along the axial direction L of the connector 4.

The pin connection part 43 is formed at the other end part of the connector 4 along the axial direction L of the connector 4. FIG. 4 shows a side view of the connector 4.

The other end part of each core wire 32 of the sheath pin is electrically connected to the corresponding pin connection part 43 of the connector 4 by soldering or welding.

The front end part 611 of the conductive lead wire 6 is forcedly pressed to the communication part 44 in order to be electrically connected together. Each of the conductive lead wires 6 is made by coating a wire 61 with insulation layer 62 such as resin, etc. The insulation layer 62 coated on the front end part 611 of the conductive lead wire 6 is stripped in order to be electrically connected to the corresponding communication part 44 of the connector 4.

The supporting member 5 is made of elastic material (such as rubber bush) having an elastically deforming function. For example, the supporting member 5 is made of binary fluororubber by using a die.

As shown in FIG. 3, the paired inserting and supporting holes 51 are formed in the supporting member 5 so that paired short diameter parts 51B face to each other. A bridge part 511 is formed between the paired inserting and supporting holes 51 in the supporting member 5

The bridge part 511 is formed so that the central part thereof has the minimum thickness and the thickness thereof is gradually increased toward the outer periphery of the supporting member 5. The shape of the supporting member 5 makes it possible to fill rubber member into the bridge part 511. This makes it possible to easily form the supporting member 5 having a small diameter within a range of 5 to 6 mm.

As shown in FIG. 3, the circular arc part 41 has a profile of a circular art shape of not less than a half circumference shape. Further, the circular arc part 41 has a shape along a profile of an outer circumference of a front end part 611 of each lead wire 6.

Each of the paired claw parts 42 is bent in a direction opposite to the bending direction of the circular arc part 41 in a lateral direction which is perpendicular to the axial direction L of the connector 4 from both the ends of the circular arc part 41 in the circumference direction.

As shown in FIG. 3, before inserting the connector 4 into the inserting and supporting holes 51, the connector 4 is formed so that a distance between the front ends 421 of the paired claw parts 42 is larger than a diameter of a large diameter part 51A of the inserting and supporting holes 51. The front end part 611 of the conductive lead wire 6 is placed at the communication part 44 of the connector 4, and the circular arc part 41 and the paired claw parts 42 are inserted into the inner wall part of the inserting and supporting holes 51 while the circular arc part 41 and the paired claw parts 42 are elastically deformed so as to decrease the distance between the front end parts 421 of the paired claw parts 42.

The connector 4 is supported by the inner wall surface of the inserting and supporting holes 51 when the inserting and supporting holes 51 is elastically deformed by the front ends 421 of the paired claw parts 42. The connector 4 is stably supported in the supporting member 5 by using righting moment of the inserting and supporting holes 51.

As shown in FIG. 3, in the temperature sensor 1 according to the exemplary embodiment, each of the paired connectors 4 is supported at the four points, namely, the front end parts P1 and the P2, by the inner wall surface of the corresponding inserting and supporting holes 51.

It is possible for the connector 4 and the inserting and supporting holes 51-1 to have other structures.

Figure 6:
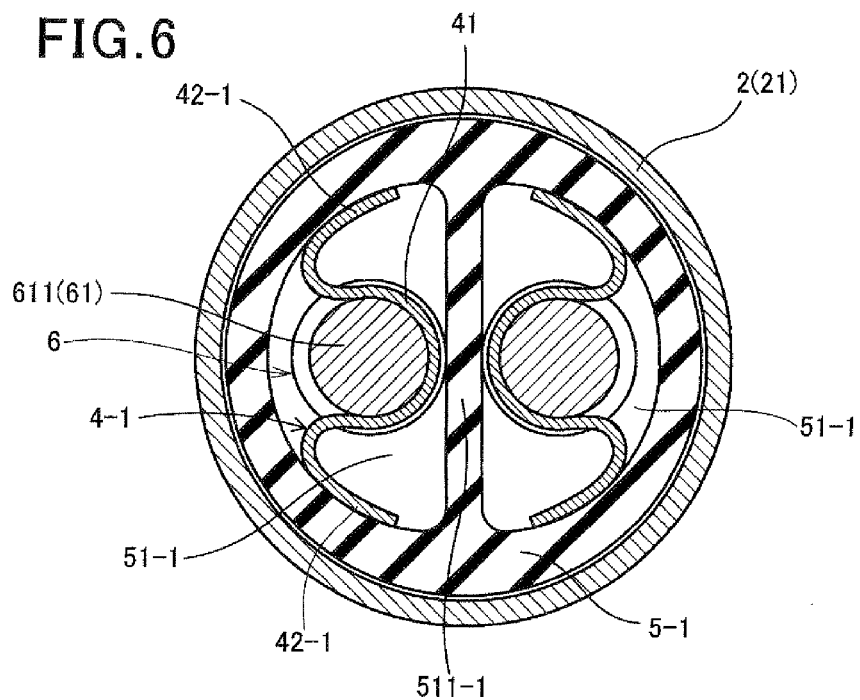
FIG. 6 is a view showing a cross section of the peripheral part of the connector and the inserting and supporting holes having another structure along the A-A line shown in FIG. 2.

FIG. 6 is a view showing a cross section of the peripheral part of a connector 4-1 and an inserting and supporting holes 51-1 having another structure along the A-A line shown in FIG. 2;

As shown in FIG. 6, the inserting and supporting holes 51-1 have a cross section of a semi-circular shape instead of the ellipse shape shown in FIG. 3. In this structure, the circular arc part is formed at the outer circumference part in the semi-circular shape of the inserting and supporting holes 51-1.

Figure 7:
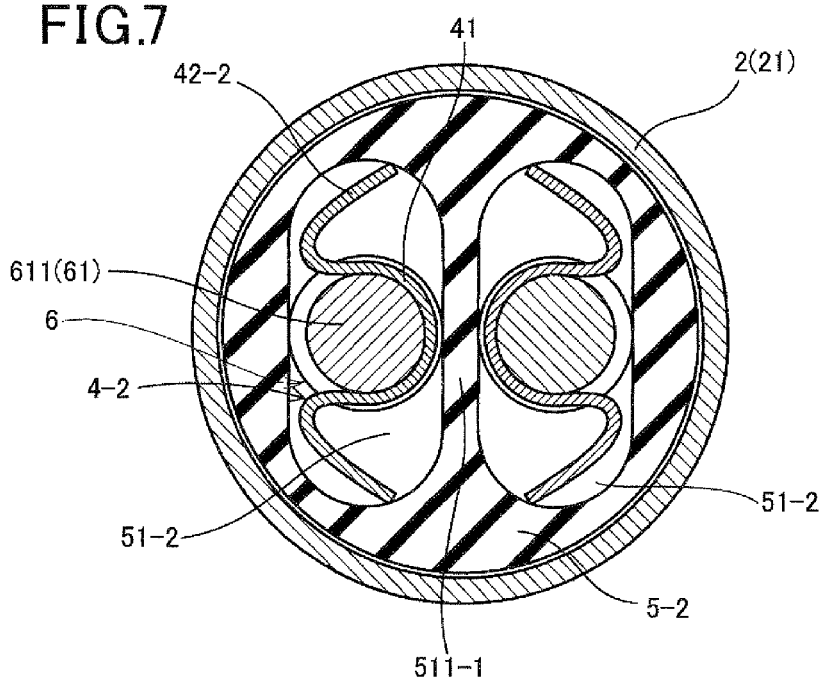
FIG. 7 is a view showing a cross section of the peripheral part of the connector and the inserting and supporting holes having another structure along the A-A line shown in FIG. 2.

FIG. 7 is a view showing a cross section of the peripheral part of a connector 4-2 and an inserting and supporting holes 51-2 having another structure along the A-A line shown in FIG. 2;

As shown in FIG. 7, the inserting and supporting holes 51-2 has a longitudinal-hole shape in which paired inner walls of a straight shape in each of the inserting and supporting holes 51-2 are in parallel along its longitudinal direction. It is most preferable for the inserting and supporting hole 51 to have a cross section of an ellipse shape (see FIG. 3) in the view of having the supporting force of the connector 4 against the inner wall surface of the inserting and supporting holes 51 and deforming the inserting and supporting hole 51.

As shown in FIG. 1, a nipple 24 is placed at the outer periphery of the protection tube 21 in order to fix the temperature sensor 1 to the body of a motor vehicle. A fixing part 25 is placed at the front end part of the protection tube 21 in order to fix the cylindrical outer tube 22 to the inside of the protection tube 21. A pair of the lead wires 6 is extended from the rear end part of the paired lead wires 6. In addition, a connector part (not shown) is placed at the rear end part of the paired lead wires 6 through which the paired lead wires 6 are electrically connected to an outside control device.

In the exemplary embodiment, as shown in FIG. 1, the paired lead wires 6, the supporting member 5 and the protection tube 21 are caulked by the caulked part 211 which is a position along an axial direction L of the temperature sensor 1 at the outer periphery of the paired inserting holes 52 in the supporting member 5 so that the diameter of the caulked part 211 is decreased.

The exemplary embodiment does not use any cement material (such as ceramic material) which is not elastically deformed and fixes the position of the connector 4. That is, the exemplary embodiment uses the supporting member 5 made of rubber bush which can be deformed in an axial direction L of the temperature sensor 1 during the caulking process. Such caulking does not provide stress to the connector 4 along the axial direction L.

In more detail, a conventional temperature sensor requires additional caulking to the connector by using cement material in order to relax the stress supplied toward the axial direction L at a position before the supporting member in addition to calking to the rubber bush and tube.

On the other hand, the structure of the temperature sensor 1 according to the exemplary embodiment can be produced without the above additional calking. This makes it possible to simply produce the temperature sensor 1 with low manufacturing cost.

As shown in FIG. 5, in the above caulking at the position of the paired lead wires 6, the supporting member 5 and the protection tube 21, it is necessary to have an optimum relationship between a first caulking ratio X1 in the direction L1 through between the paired lead wires 6 and a second caulking ratio X2 in the direction L2 on the paired lead wires 6.

It is possible to calculate the first caulking ratio X1 by the following equation:

$$X1=\{D-(D'-2t)\}/D\times100(\%),$$

where D (mm) designates a diameter of the supporting member 5 (made of rubber bush) before caulking, D' (mm) indicates a diameter of the supporting member 5 after caulking, and t (mm) is a thickness of the protection tube 21.

It is possible to calculate the second caulking ratio X2 by the following equation:

$$X2=\{D-2d-(D'-2t-2a)\}/(D-2d)\times100(\%),$$

where D (mm) designates a diameter of the supporting member 5 (made of rubber bush) before caulking, D' (mm) indicates a diameter of the supporting member 5 after caulking, t (mm) is a thickness of the protection tube 21, d (mm) indicates an inner diameter of the inserting hole 52 of the lead wire 6, and a (mm) is a diameter (outer diameter) of the lead wire 6.

The exemplary embodiment determines that the first caulking ratio X1 has a value of not less than 10%, and the second caulking ratio X2 has a value of not less than 10%. More specifically, the first caulking ratio X1 has a value within a range of 15 to 25% and the second caulking ratio has a value within a range of 25 to 50% in the view of dimensional tolerance.

This structure of the temperature sensor 1 according to the exemplary embodiment makes it possible to maintain the heat resistance to the sealing of the temperature sensor 1.

The temperature sensor 1 according to the exemplary embodiment has the structure in which the inserting and supporting holes 51 accommodate the connector 4 in the supporting member 5, where the core wires 32 of the sheath pin and the lead wires 6 are connected through the connector 4. The communication part 44 of the connector 4 supports the front end part 611 of the conductive lead wire 6, and the four parts, the front end part 421 of each claw part 42 of the connector 4 and the bended base part 422 of each claw part 42 at which the connector 4 is bent are pushed to the inner wall surface of the inserting and supporting holes 51. This makes it possible to support the connector 4 in the inserting and supporting holes 51 of the supporting member 5 with a simple structure and to produce the temperature sensor with simple manufacturing processes.

The structure of the temperature sensor 1 according to the exemplary embodiment previously described, in particular, the structure of the connector 4 and the supporting member 5 can satisfy all of the functions such as ease of assembly, electrical insulation and conductivity, physical strength, heat resistance of sealing, etc. Specifically, the function of ease of assembly can be increased by using no ceramic material although the structure of the conventional temperature sensor requires using the ceramic material. Further, it is possible to maintain the supporting force of the connector 4 in the temperature sensor 1 by using the shape of the claw parts 42 formed at both the ends of the circular arc part 41 and the shape of the inserting and supporting hole 51 in the supporting member 5 made of an elastic member. Still further, it is possible to increase the supporting force of the connector 4 by using the shape of the inserting and supporting hole 51 having a cross section of an ellipse shape.

The connectors 4 can be electrically insulated from each other and have the function of electrical conductivity by using the supporting member 5 made of binary fluoro-rubber because the supporting member 5 can electrically insulate the connector 4 to each other. Using such binary fluoro-rubber can increase the electrical insulation of the connector 4.

The function of electrical insulation can be obtained when the supporting member 5 absorbs the force which presses the connectors 4 when the protection tube 21 is caulked at the caulked part 211 together with the lead wires 6 and the supporting member 5. Further, this decreases the stress supplied to the core wires 32 of the sheath pin. It is thereby possible to suppress the core wires 32 of the sheath pin from being deformed, and the connector 4 from being in contact with each other.

Further, the function of tension resistance can be obtained by using the supporting member 5 and the connectors 4, where the supporting member 5 is made of an elastic member and has the inserting and supporting holes 51, and the claw parts 42 of each connector 4 extend at both the ends of the circular arc part 41 in a circumference direction. This structure of the connectors 4 makes it possible to absorb the strength in an axial direction of the lead wires 6 by the supporting member 5 and decrease the stress supplied to the connectors 4.

The function of heat resistance of sealing can be obtained by using the supporting member 5 made of elastic material.

As previously described in detail, the structure of the temperature sensor 1 according to the exemplary embodiment makes it possible to satisfy all of the functions, such as ease of assembly, electrical insulation and conductivity, stress resistance, and heat resistance of sealing which are required to the part in the temperature sensor 1 through which the core wires 32 of the sheath pin and the lead wires 6 are electrically connected together.

(Experimental Tests)

The experimental tests of test samples as the temperature sensor 1 were performed in order to detect the heat resistance of sealing, electrical insulation and conductivity and tension resistance.

The function of heat resistance of sealing was detected as follows. In general, the temperature sensor 1 is used in an exhaust gas of an internal combustion engine mounted to a motor vehicle. There is water of a high temperature near to 240° C. which is instantly heated by the exhaust gas pipe of a high temperature. On the other hand, the inside of the temperature sensor 1 has a condition at a low pressure, when compared with the pressure around the temperature sensor 1, by the rapid temperature change of the atmosphere surrounding the temperature sensor 1.

In the experiment, ten test samples as the temperature sensor 1 were placed in the atmosphere of a temperature of 240° C. over 250 hours. After this, the pressure of the inside of the ten test samples was decreased to 30 kPa. The lead wire 6 side of each of the ten test samples was dipped into water by 100 mm of the front part of each of the ten test samples in the atmosphere of 140° C. in order to detect the air leakage performance of each test sample as the temperature sensor 1. As a result of the above test, no leakage of water was detected in all of the ten test samples. This indicates that the temperature sensor 1 according to the exemplary embodiment of the present invention has a high heat resistance of sealing.

The function of electrical insulation and conductivity of the temperature sensor 1 was detected by the following method.

The electrical insulation and conductive characteristics of the part in each test sample was detected by the following test, where through the part the core wires 32 of the sheath pin and the lead wires 6 are electrically connected in the temperature sensor 1. It was detected whether or not the deformation is generated in the core wires 32 of the sheath pin when the supporting member 5 was deformed toward an axial direction L of each test sample as the temperature sensor 1.

Figure 8:
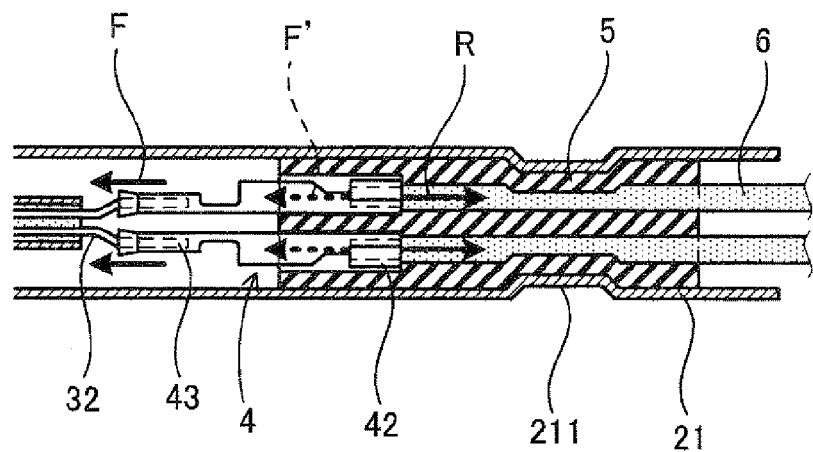
FIG. 8 is a view explaining the balance of force applied to the peripheral part of the connector during the electrical insulation and conductivity test.

FIG. 8 is a view explaining the balance of force applied to the peripheral part of the connector 4 during the test of electrical insulation and conductivity.

As shown in FIG. 8, when the caulked part 211 is caulked, the supporting member 5 is deformed toward the caulked part 211 side. According to the deformation of the caulked part 211, the supporting member 5 generates a force F by the volume contraction of the supporting member 5 and supplies the force F to the connector 4.

When the temperature sensor 1 is actually used, the supporting member 5 is expanded by ambient gas of a high temperature, this thermal expansion of the supporting member 5 increases the above force F which is supplied to the connector 4. An opposite force R against the force F is supplied to the supporting member 5 from the connector 4. The force F and the opposite force R are balanced.

When the force F is smaller than the critical strength of the elastic deformation of the core wires 32 of the sheath pin, the core wires 32 of the sheath pin are not deformed. This makes it possible to maintain the electrical insulation and conductivity which is necessary to the above connection part of the connector 4. The critical strength of elastic deformation of each of the ten test samples was detected under predetermined conditions. The detection results indicate that the stress (load) F supplied to the core wires 32 of the sheath pin was smaller than the critical strength of elastic deformation of the core wires 32 of the sheath pin of each test sample. This indicates that the temperature sensor 1 according to the exemplary embodiment can maintain the electrical insulation and conductivity without deforming the core wires 32 of the sheath pin.

The function of tension resistance of each test sample as the temperature sensor 1 was detected.

That is, the tension resistance of the connection part in the temperature sensor 1 can be achieved by the structure of the core wires 32 of the sheath pin without deformation even if the lead wires 6 are tensed, where the core wires 32 of the sheath pin are electrically connected to the lead wires 6 by the connection part.

Figure 9:
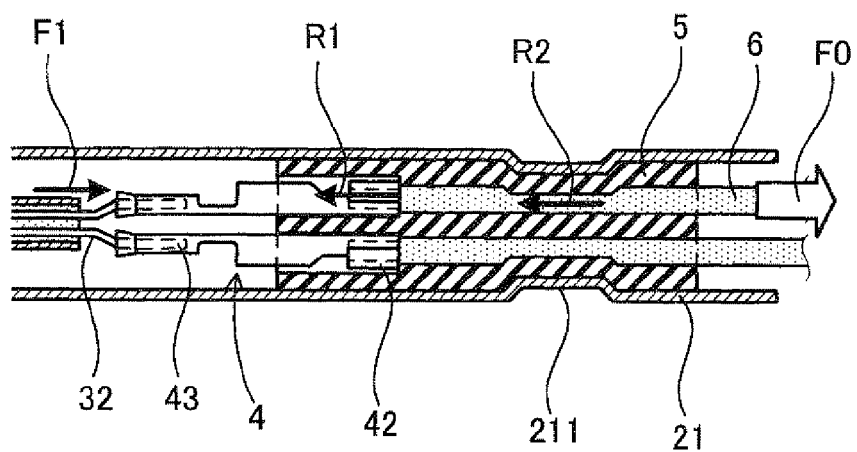
FIG. 9 is a view explaining the balance of force applied to the peripheral part of the connector when a tension resistance test is executed.

FIG. 9 is a view explaining the balance of force applied to the peripheral part of the connector when a tension resistance test is executed.

As shown in FIG. 9, when the lead wires 6 are tensed by force F0, the force R1 from the connector 4 to the supporting member 5 and abrasion force R2 generated between the supporting member 5 and the lead wires 6 at the caulked part 211 are supplied to the direction which is opposite to the tension of the lead wires 6. On the other hand, the force F1 is supplied to the core wires 32 of the sheath pin toward the direction of the lead wires 6. The force F1 can be expressed by the following equation:

$$F1=(F0-R1-R2).$$

When the force F1 is smaller than the critical strength of elastic deformation of the core wires 32 of the sheath pin, the core wires 2 of the sheath pin are not deformed and this makes it possible to maintain the strain resistance which is necessary to the connection part through which the core wires 32 of the sheath pin and the lead wires 6 are electrically connected together. The experimental results of the ten test samples executed under a predetermined condition indicate that the stress F1 generated in the core wires 32 of the sheath pin is smaller than the critical strength of elastic deformation of the core wires 32 of the sheath pin. This makes it possible to maintain the strain resistance of the connection part without deforming the core wires 32 of the sheath pin.

(Other Features of the Present Invention)

In the temperature sensor 1 according to the exemplary embodiment, it is preferred that the circular arc part 41 and the claw parts 42 are formed at an end part of each of the connectors 4 in an axial direction of the connectors 4. The circular arc part 41 has a circular-arc shape of not less than a semi-circumference of the lead wire 6. The claw parts 42 are formed at both the end parts of the circular arc part 41 in a circumference direction toward a direction which is perpendicular to an axial direction of the connectors 4. Each of the connectors 4 is supported by an inner wall surface of the inserting and supporting holes 51 at four points composed of two front end parts 421 and two bended base parts 422 of each of the connectors 4.

As described above, because each of the circular arc part 41 and the claw parts 42 in the connector 4 of the temperature sensor 1 has an optimum shape, it is possible to stably support the connectors in the inserting and supporting holes 51 of the supporting member 5.

In the temperature sensor 1, it is preferred that each of the inserting and supporting holes 51 of the supporting member 5 has a cross section of an ellipse shape. Each of the connectors 4 is supported by the inner wall surface of the inserting and supporting holes 51 so that each of the claw parts 42 of each of the connectors 4 deforms the inner wall surface of the corresponding inserting and supporting holes 51. This structure makes it possible to support the connectors 4 by recovering force of elastic deformation of the inserting and supporting holes 51.

In the temperature sensor 1, it is preferred that the supporting member 5 is made of binary fluoro-rubber. This structure makes it possible for the supporting member 5 to have the adequate functions of heat resistance and electrical insulation. It is possible for the supporting member 5 to have high durability even if the temperature sensor 1 is used in an exhaust gas pipe of an internal combustion engine at high temperature. In particular, it is possible to use various materials which are elastically deformed instead of binary fluoro-rubber. For example, ternary fluoro-rubber, silicon rubber, etc.

Still further, in the temperature sensor 1, it is preferred that a pair of the inserting and supporting holes 51 is formed in parallel to each other in the supporting member 5, a pair of the core wires 32 of the sheath pin, a pair of the lead wires 6 and a pair of the connectors 4 are formed in the protection tube (21) in one-to-one correspondence. The inserting hole 52 is formed in each of the inserting and supporting holes 51 in the supporting member 5 through which the corresponding lead wire 6 is inserted in the supporting member 5.

This structure of the temperature sensor 1 makes it possible to electrically connect the paired electrodes extended from the temperature sensor element with the paired core wires of the sheath pin, the paired connectors and the paired lead wires. Still further, it is possible to stably support the paired connectors and the paired lead wires because the supporting member has an optimum structure.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A temperature sensor comprising:
a temperature sensitive element configured to detect a temperature;
a sheath pin comprising core wires which are electrically connected to the temperature sensitive element;
lead wires corresponding to the core wires of the sheath pin, through which a detection signal of the temperature sensitive element is output to an outside device;
connectors through which the core wires of the sheath pin and the lead wires are electrically connected together; and
a protection tube configured to accommodate the core wires of the sheath pin, the lead wires and the connectors, and equipped with a supporting member made of an elastic member having inserting and supporting holes through which the connectors are inserted and supported, and the protection tube, the supporting member and the lead wires being caulked together, and a stress applied to the core wires of the sheath pin connected to the lead wires being smaller than a critical strength of elastic deformation of the core wires of the sheath pin,
wherein each of the connectors comprises a circular arc part and claw parts, the circular arc part is made along a profile of an outer circumference of a front end part of each lead wire, and the claw parts are formed at both the end parts of the circular arc part, and each of the claw parts pushes an inner wall surface of the corresponding inserting and supporting hole; and
each of the connectors is supported by the inner wall surface of the inserting and supporting holes to deform the inner wall surface of the corresponding inserting and supporting holes by a front end of each of the claw parts of each of the connectors.

2. The temperature sensor according to claim 1, wherein the circular arc part and the claw parts are formed at an end part of each of the connectors in an axial direction of the connectors, the circular arc part has a circular arc shape of not less than a semi-circumference of the lead wire, and the claw parts are formed at both the end parts of the circular arc part in a circumference direction toward a direction which is perpendicular to an axial direction of the connectors, and
each of the connectors is supported by an inner wall surface of the inserting and supporting holes at four points composed of two front end parts and two bended base part of each of the connectors.

3. The temperature sensor according to claim 1, wherein each of the inserting and supporting holes of the supporting member has a cross section of an ellipse shape.

4. The temperature sensor according to claim 1, wherein the supporting member is made of binary fluoro-rubber.

5. The temperature sensor according to claim 1, wherein a pair of the inserting and supporting holes is formed in parallel to each other in the supporting member,
a pair of the core wires of the sheath pin, a pair of the lead wires and a pair of the connectors are formed in the protection tube in one-to-one correspondence, and
an inserting hole is formed in each of the inserting and supporting holes in the supporting member, through which the corresponding lead wire is inserted in the supporting member.

6. The temperature sensor according to claim 1, wherein the circular arc part and the claw parts are formed at an end part of each of the connectors in an axial direction of the connectors, the circular arc part has a circular-arc shape of not less than a semi-circumference of the lead wire, and the claw parts are formed at both the end parts of the circular arc part in a circumference direction toward a direction which is perpendicular to an axial direction of the connectors,
each of the inserting and supporting holes has a semi-circular shape, and
each of the connectors is supported by an inner wall surface of the corresponding inserting and supporting hole by the claw parts.

7. The temperature sensor according to claim 1, wherein the circular arc part and the claw parts are formed at an end part of each of the connectors in an axial direction of the connectors, the circular arc part has a circular-arc shape of not less than a semi-circumference of the lead wire, and the claw parts are formed at both the end parts of the circular arc part in a circumference direction toward a direction which is perpendicular to an axial direction of the connectors,
each of the inserting and supporting holes has a structure having a pair of straight-line walls which are formed in parallel, and
each of the connectors is supported by an inner wall surface of the corresponding inserting and supporting hole by the front end part of each of the claw parts.

8. The temperature sensor according to claim 1, wherein the elastic member comprises a rubber bush.

9. The temperature sensor according to claim 1, wherein the elastic member is made of binary fluoro-rubber.

* * * * *